United States Patent
Thomas

(10) Patent No.: US 9,089,123 B1
(45) Date of Patent: Jul. 28, 2015

(54) WILD GAME INFORMATION SYSTEM

(76) Inventor: Mark Holton Thomas, Mobile, AL (US)

(*) Notice: Subject to any disclaimer, the term of this patent is extended or adjusted under 35 U.S.C. 154(b) by 507 days.

(21) Appl. No.: 13/276,895

(22) Filed: Oct. 19, 2011

(51) Int. Cl.
*G01S 11/00* (2006.01)
*A01M 31/00* (2006.01)
*A01M 29/16* (2011.01)
*G01S 11/14* (2006.01)

(52) U.S. Cl.
CPC .......... *A01M 29/16* (2013.01); *A01M 31/002* (2013.01); *G01S 11/14* (2013.01)

(58) Field of Classification Search
USPC ........................................................ 367/118
See application file for complete search history.

(56) References Cited

U.S. PATENT DOCUMENTS

| | | | |
|---|---|---|---|
| 5,559,759 A * | 9/1996 | Gerstein et al. | 367/139 |
| 5,956,463 A * | 9/1999 | Patrick et al. | 704/232 |
| 6,535,131 B1 * | 3/2003 | Bar-Shalom et al. | 340/573.1 |
| 7,117,149 B1 * | 10/2006 | Zakarauskas | 704/233 |
| 7,377,233 B2 * | 5/2008 | Patton | 119/712 |
| 8,442,833 B2 * | 5/2013 | Chen | 704/270 |
| 2002/0064094 A1 * | 5/2002 | Gaspari | 367/139 |
| 2004/0223625 A1 * | 11/2004 | Stilwell | 381/124 |
| 2006/0150920 A1 * | 7/2006 | Patton | 119/712 |
| 2010/0211387 A1 * | 8/2010 | Chen | 704/226 |
| 2011/0025531 A1 * | 2/2011 | Geelen et al. | 340/995.1 |
| 2011/0264362 A1 * | 10/2011 | Van Raamsdonk et al. | 701/200 |

* cited by examiner

*Primary Examiner* — James Hulka

(57) ABSTRACT

An apparatus and methods for collecting data and monitoring vocalizations of wildlife and transmitting same to a user are described. The apparatus comprises one or more microphones coupled to a device for recording and processing captured audio signals and providing the captured information to a user. Several methods for use of the apparatus to collect data and monitor subjects of information are disclosed.

25 Claims, 14 Drawing Sheets

FIG. 13

| Gobble | Correlation (Time) | Correlation (Freq) | Gobble | Correlation (Time) | Correlation (Freq) |
|---|---|---|---|---|---|
| 1 | 0.1729 | 0.0819 | 37 | 0.0814 | 0.0999 |
| 2 | | | 38 | 0.0795 | 0.094 |
| 3 | 0.0801 | 0.0928 | 39 | 0.0779 | 0.0824 |
| 4 | 0.1253 | 0.1411 | 40 | 0.0953 | 0.0976 |
| 5 | 0.0788 | 0.0799 | 41 | 0.0871 | 0.0952 |
| 6 | 0.0996 | 0.1098 | 42 | 0.0755 | 0.0876 |
| 7 | 0.1376 | 0.1522 | 43 | 0.095 | 0.1077 |
| 8 | 0.0853 | 0.0967 | 44 | 0.0958 | 0.104 |
| 9 | 0.0884 | 0.1012 | 45 | 0.0855 | 0.1067 |
| 10 | 0.0998 | 0.0976 | 46 | 0.0909 | 0.084 |
| 11 | 0.0758 | 0.1077 | 47 | 0.0895 | 0.1139 |
| 12 | 0.1382 | 0.2197 | 48 | 0.0764 | 0.1041 |
| 13 | 0.0991 | 0.1065 | 49 | 0.0989 | 0.159 |
| 14 | 0.0726 | 0.0808 | 50 | 0.0747 | 0.1024 |
| 15 | 0.076 | 0.0901 | 51 | 0.0753 | 0.0781 |
| 16 | 0.0781 | 0.0878 | 52 | 0.0687 | 0.0881 |
| 17 | 0.0808 | 0.0943 | 53 | 0.0856 | 0.0797 |
| 18 | 0.08 | 0.0795 | 54 | 0.0648 | 0.0719 |
| 19 | 0.1144 | 0.0891 | 55 | 0.098 | 0.1483 |
| 20 | 0.0683 | 0.1045 | 56 | 0.0762 | 0.0875 |
| 21 | 0.0775 | 0.0721 | 57 | 0.0649 | 0.0878 |
| 22 | 0.0704 | 0.0733 | 58 | 0.082 | 0.0913 |
| 23 | 0.0918 | 0.0863 | 59 | 0.1014 | 0.0849 |
| 24 | 0.082 | 0.137 | 60 | 0.0833 | 0.0854 |
| 25 | 0.0779 | 0.0832 | 61 | 0.1779 | 0.0759 |
| 26 | 0.0749 | 0.081 | 62 | 0.1267 | 0.1862 |
| 27 | 0.0785 | 0.0742 | 63 | 0.0766 | 0.0744 |
| 28 | 0.0903 | 0.0813 | 64 | 0.0839 | 0.0893 |
| 29 | 0.0837 | 0.0685 | 65 | 0.1034 | 0.1059 |
| 30 | 0.091 | 0.0673 | 66 | 0.0795 | 0.0872 |
| 31 | 0.092 | 0.1073 | 67 | 0.0802 | 0.0972 |
| 32 | 0.0756 | 0.0932 | 68 | 0.1139 | 0.1638 |
| 33 | 0.0886 | 0.1063 | 69 | 0.1625 | 0.2582 |
| 34 | 0.0996 | 0.118 | 70 | 0.083 | 0.089 |
| 35 | 0.0979 | 0.068 | 71 | 0.0816 | 0.0823 |
| 36 | 0.1005 | 0.115 | | | |
| | | | | Min(Time)=0.0649 | Min(freq)=0.0719 |

FIG. 14

| Other | Correlation (Time) | Correlation (Freq) |
|---|---|---|
| 1 | 0.0732 | 0.0702 |
| 2 | 0.0196 | 0.0126 |
| 3 | 0.0591 | 0.0795 |
| 4 | 0.057 | 0.1274 |
| 5 | 0.0528 | 0.0559 |
| 6 | 0.0404 | 0.0269 |
| 7 | 0.042 | 0.0262 |
|  |  |  |
|  | Max(Time)=0.0732 | Min(Freq)=0.0702 |

WILD GAME INFORMATION SYSTEM

FIELD OF THE INVENTION

The present invention relates generally to information related to wild game and, more particularly, to methods and apparatus for obtaining information relating to wild game in one or more chosen locations.

BACKGROUND

Automated monitoring of wildlife is known in the art. U.S. Pat. No. 5,956,463 discloses an automated system for monitoring wildlife auditory data and recording same for subsequent analysis and identification. The system includes one or more microphones coupled to a recording apparatus for recording wildlife vocalizations in digital format. The resultant recorded data is preprocessed, segmented and analyzed by means of a neural network to identify respective species.

U.S. Pat. No. 7,377,233 discloses an apparatus for detecting and identifying birds based on an electronic analysis of their calls and songs and a method for doing so by utilizing a step-by-step hierarchical method of breaking down bird vocalizations according to order, family and species of the specific bird. Several embodiments of the apparatus are disclosed, including a hand held computational device, microphone, audio capture card, user application software and a collection of prerecorded audio data.

U.S. Pat. No. 7,117,149 discloses a system for classifying a sound source. The system matches the acoustic input to a number of signal models, one per source class, and produces a score for each signal model. The sound source is declared to be of the same class as that of the model with the best score if that score is sufficiently high. In the preferred embodiment, classification is accomplished by the use of a signal model augmented by learning. The input signal can represent human speech, in which case the goal is to identify the speaker in a text-independent manner. The system can be used to classify any type of live or recorded acoustic data, such as musical instruments, birds, engine or machine noise or human singing.

U.S. Pat. No. 6,535,131 discloses a device for automatically identifying sound patterns accompanying physiological processes and activities of an animal in general, and uttered by an animal in distress in particular, especially of a pregnant animal going into labor, for storing, analyzing and processing data related to the identified sound patterns and any deviations, and for providing an attendant with alert signals and data according to pre-programmed requirements. The device includes an audio receiving device placed in proximity to the animal for receiving sound patterns. A communication interface communicates with a remote communication unit.

U.S. Published Patent Application Serial No. 2010/0211387 discloses a computer implemented speech processing system. The system extracts first and second voice segments from first and second audio signals originating from first and second microphones. The first and second voice segments correspond to a voice sound originating from a common source. An estimated source location is generated based on a relative energy of the first and second voice segments and/or a correlation of the first and second voice segments. A determination whether the voice segment is desired or undesired is made based on the estimated source location.

SUMMARY

The present invention provides for methods and an apparatus for obtaining information on wildlife. The apparatus includes one or more microphones or other audio receiving devices which receive sound patterns, converting the sound patterns into audio signals. The microphones transmit these audio signals to a controller. The controller contains a processing unit which analyzes the incoming audio signals, determining if the audio signals are above some background threshold and whether the audio signals correspond to wildlife of interest. A clock unit in the controller records the date and time for audio signals that correspond to wildlife of interest. A location detector provides the location of the audio signals that correspond to wildlife of interest. A user can communicate with the controller through a user interface; for example, either downloading information or uploading instructions to the controller. A storage unit within the controller stores the audio signals that correspond to wildlife of interest along with data collected for these audio signals, such as the date and/or location.

In another embodiment, a method of obtaining information on wildlife in a chosen area is provided. As provided in this embodiment, one or more audio receiving devices are placed in one or more locations. The audio device is connected to a controller which contains a processing unit. The audio receiving devices then convert sound patterns into audio signals which are then transmitted to the controller. These audio signals are then analyzed to obtain information on wildlife in the chosen area.

In another embodiment, a method of obtaining information on the reaction of wildlife in a chosen area to certain vocalizations is provided. Audio receiving devices are placed in one or more locations. These audio receiving devices are connected to a controller, which contains a storage unit. One or more pre-recorded audio signals are uploaded into the storage unit. Attached or embedded in the controller is also one or more audio producing devices, such as a speaker. Pre-recorded audio signals are played in varied ways to provoke a response in wildlife of interest of the chosen area. After the audio receiving devices convert sound patterns into audio signals, these audio signals are transmitted to the controller. These audio signals are then analyzed to obtain information on wildlife in the chosen area.

A further understanding of the nature and advantages of the present invention will be realized by reference to the remaining portions of the specification and the drawings.

BRIEF DESCRIPTION OF THE DRAWINGS

FIG. 13 is a table of seventy (70) turkey gobbles correlated to a control signal (Turkey Gobble).

FIG. 14 is a table of seven (7) non-turkey gobbles correlated to a control signal (Turkey Gobble).

DESCRIPTION OF THE SPECIFIC EMBODIMENTS

Figure 1:
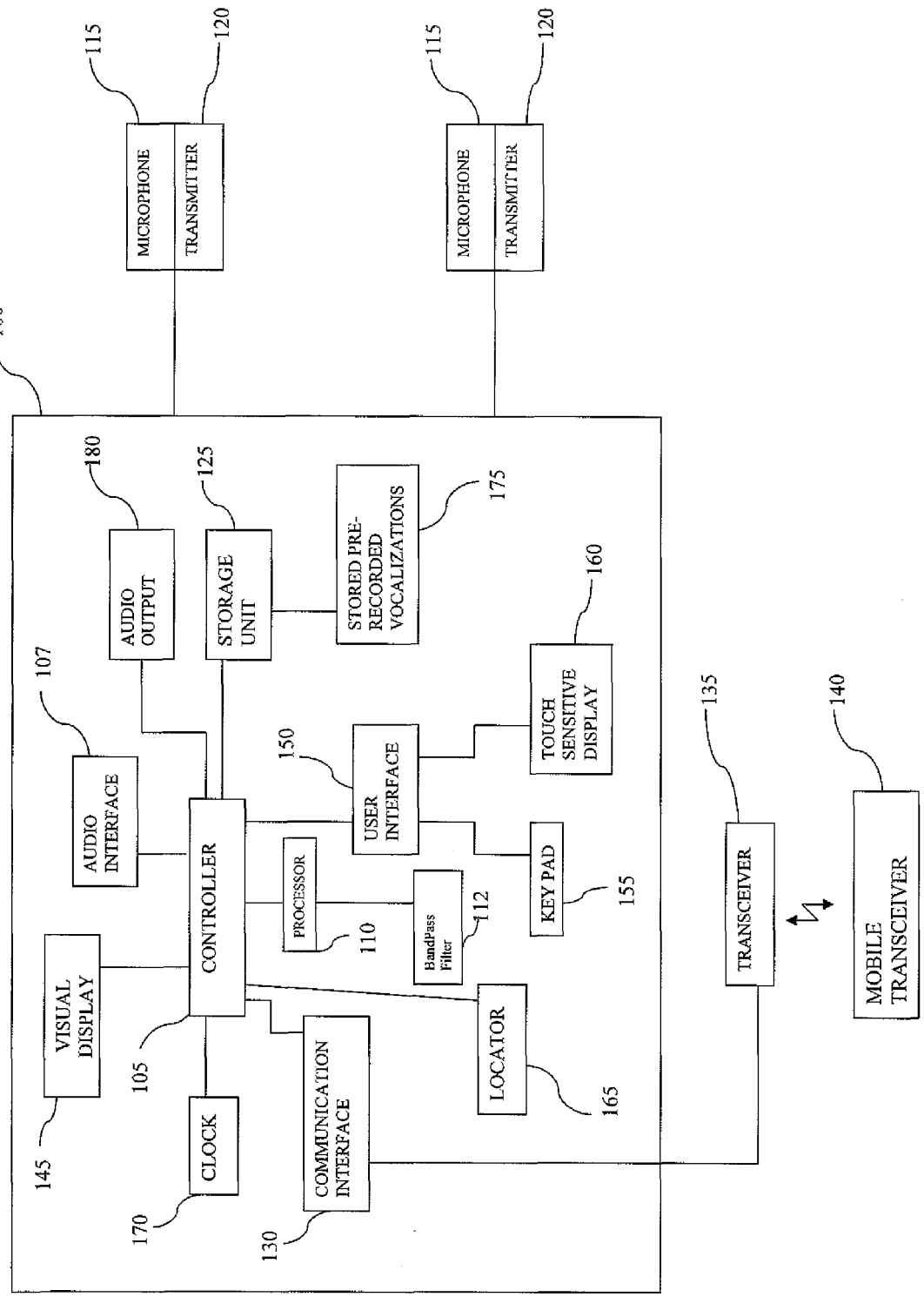
FIG. 1 is a block diagram illustrating a device to obtain and record information of wild game in a chosen area.

FIG. 1 is a block diagram of a central device for obtaining information and recording information of wildlife in a chosen area by hunters. The central device 100 includes a controller 105 with a processing unit 110, a storage unit 125, a clock unit 170, a user interface 150, a location device 165 and a communication interface 130. One or more microphones 115 or other sound capturing devices along with transmitters 120 is connected to central device 100 either by physical or remote connections. Central device 100 is connected to a transceiver 135 that is able to communicate to a mobile transceiver 140.

Processing unit 110 of controller 105 includes one or more processing cores. Processing unit 110 is configured to run software applications and optionally an operating system. Such software applications are stored in storage unit 125. Instructions and directions are loaded into processing unit 110 for execution. Processing unit includes a mechanism for transforming analog signals to digital format and storage thereof in storage unit 125. Processing unit 110 is in communication with clock unit 170, user interface 150, location device 165 and communication interface 130.

Processing unit 110 includes procedures or software applications for performing a one-step or a multi-step procedure for distinguishing sound patterns. Processing unit 110 includes a first step to filter out ambient or background noise from sound patterns of interest. In particular, processing unit 110 is attached to a band-pass filter device 112. Processing unit 110 also includes a second step for determining if audio signals correlate to a control signal created from the subject of interest. For example, the audio signal's time and frequency domain are compared to the vocalization of the subject of interest using a Fast Fourier Transform (FTT) to determine if the audio signal matches a subject of interest. It will be understood that processing unit 110 includes software or other applications that include more than two steps to match audio signals to a subject of interest.

Processing unit 110 further includes an audio system composed of one or more microphones 115, transmitters 120 and audio interface 107 of central device 100. Microphone 115 can be chosen from a plurality of microphones, such as a condenser microphone or an electret condenser microphone. Microphones 115 can be omnidirectional, bidirectional or other polar patterns. One or more microphones 115 are coupled to central device 100, controller 105 and audio interface 107 through a wired or wireless connection. Audio interface 107 contains an audio capture system composed of an analog to digital converter and a random access memory buffer wherein the results of the signal are temporarily stored. Audio interface 107 is in communication with processing unit 110.

Communication interface 130 is connected to a wireless transceiver 135 which communicates to other mobile devices 140. For example, information can be sent by communication interface 130 to a user's mobile phone. Communication interface 130 provides a command to automatically download to a mobile device 140 upon specific instructions as to timing and triggering event. The instructions can also be sent a message to a printer located at another destination (not shown) for allowing the user to print out the stored data. Alternatively, the instructions could be to send a text message to a user's cell phone or other wireless device, such as an iPad.

Central device 100 further includes a visual display 145 and a user interface 150. Visual display 145 is a liquid crystal display (LCD) or other type of visual display monitor. Visual display 145 is either illuminated for the user during times of low light conditions or not illuminated to limit the effects of the device on the wildlife behavior around the device when the user is not interacting with the device. User interface 150 could be either a keypad with buttons 155 or other indicia or a touch sensitive display 160 integrated into the visual display. Keypad 155 is composed of soft buttons with simple commands such as "START," "TEXT," or "DATA" or, alternatively, keypad 155 could be a QWERTY keyboard where the user is able to type in the required information or commands. Although the previous examples are in the English language, it is to be appreciated that commands and other information stored in the central device 100 can be in any language. It should also be appreciated that this information can be in multiple languages.

Clock unit 170 is used to include a time parameter or multiple time parameters to the data or information collected at each location. Each time parameter is paired to a location parameter derived from location device 165. Clock unit 170 is used to determine the present time of day and the present time of year. Location device 165 coupled to controller 105 is preferably adapted to determine a present location of the audio signals. To illustrate, location device 165 can generate an estimated distance of the relative energy of incoming audio signals. Location device 165 can determine the direction from which the incoming audio signals originate. Location device 165 can further determine an estimated location of incoming audio signals based on a relative energy estimation and a combination of a distance and a direction. Location device 165 can determine the location of the audio signals using any type of software application currently available or created in the future. Location device 165 can be equipped with a global positioning system (GPS).

Central device 100 includes one or more speakers 180 used to produce sounds. Storage unit 125 can include one or more pre-recorded sound records 175. Sound records 175 include pre-recorded sounds from wildlife known to trigger a vocal response in the subject of interest. By way of example, owl or crow vocalizations can cause a turkey to "shock gobble" allowing the turkey's location to be known. Each pre-recorded sound 175 includes digital data corresponding to a characteristic sound likely to produce a response by the subject. Speaker or speakers 180 can then be used to produce a sound corresponding to pre-recorded sound 175 at specified times or under specified circumstances. The time that sounds 175 are made can be recorded along with other information, such as audio signals produced by the subject of interest, to help a hunter determine specific strategies in hunting that location.

Central device 110 can be operated to reduce power consumption. This can be achieved by either time-triggering the device or sound-activating the device. With respect to time-triggering the device, the user can predetermine the duration of activation periods and the time interval between successive collection periods. The sound activation trigger is by an acoustic transient reaching a specified minimum amplitude. A triggering sound will be received by one or more of microphones 115 and will cause controller 105 to activate. Once the sound amplitude falls below the specified minimum, controller 105 will cease activity.

Figure 2:
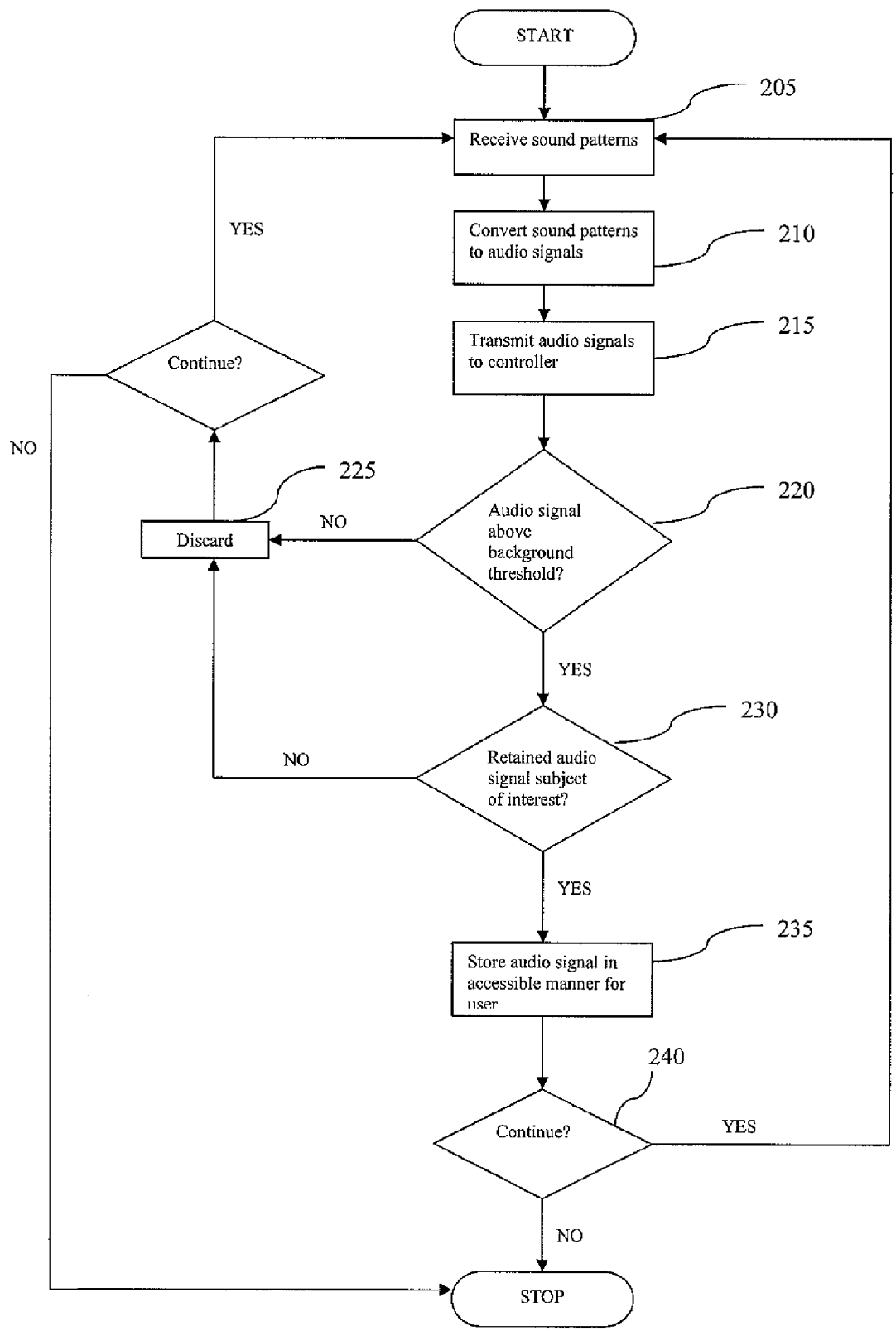
FIG. 2 is a flowchart showing a method for obtaining information of wild game in a chosen area.

FIG. 2 is a schematic illustration of a method for obtaining information and recording information of wildlife in a chosen location. In step 205, sound patterns from the chosen area are captured by audio detection devices. These audio detection devices are microphones or other audio detection devices. The sound is then converted to audio signals 210 and these audio signals are transmitted 215 to a controller device to be processed and prepared for further analysis. The audio signals are filtered 220 to remove certain other audio signals, including but not limited to, ambient noise and other undesirable sounds. If during filtering 220 no audio signals are found to include information relevant to a subject of interest, the digital files are discarded at step 225. In step 230 the processor reads the digital signal and determines if the audio signal matches the vocalization of a subject of interest. At the end of step 230, processing unit 110 stores 235 the audio signals that match the vocalizations of a subject of interest. The frequency of iteration of the steps illustrated in FIG. 2 is programmed based on the user' preference. In other words, the steps stop after one iteration, repeat as many times as specified by the user or are completed based on some other trigger or indicator and determines whether processing continues 240.

Figure 3:
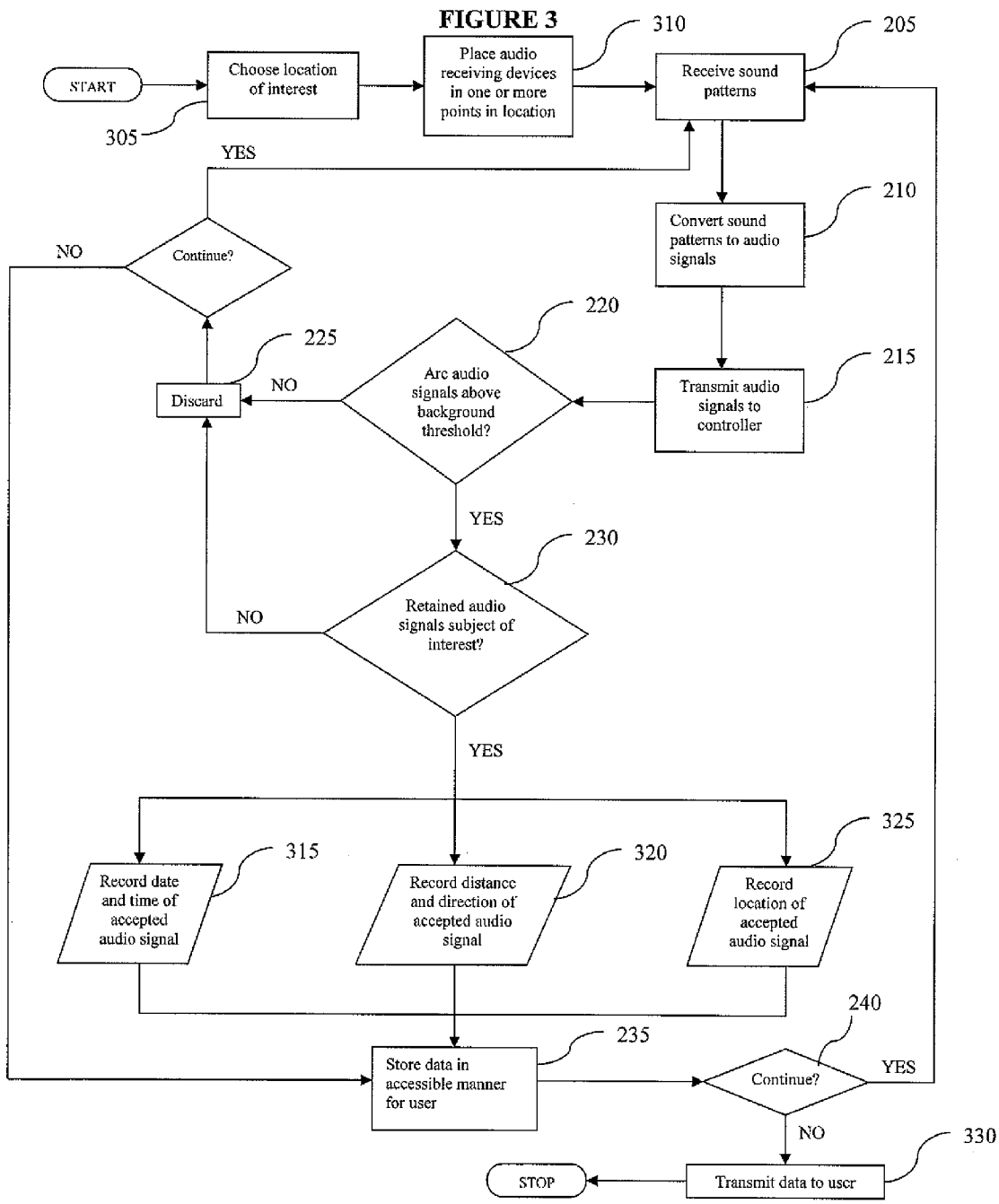
FIG. 3 is a flowchart showing a method for obtaining information of wild game in a chosen area that transmits the data to a user.

FIG. 3 is a schematic illustration of a method for obtaining information and recording information of wildlife in a chosen location. In step 305, the user chooses a location of interest. The location of interest is chosen by the user based on knowledge of the subject of interest or is chosen based on a wish by the user to determine whether a specific location is visited or inhabited by the subject of interest. The location can be a known hunting area, a new area or even an indoor area. The user then places audio receiving devices 310 in one or more places in the location. Placement of the audio receiving devices is based on mapping coordinates, previous encounters with the area or other strategies for the user.

Once the audio devices have captured 205 sound patterns, converted 210 the sound patterns to audio signals, transmitted 215 the audio signals to the controller, filtered 220 the background noise and matched 230 the audio signals to a subject of interest, the user then has the option to record the date and time 315 for audio signals that match the subject of interest, record the distance 320 from audio receiving device 115 and the direction 320 of the vocalizations that match the subject of interest, and/or record the location 325 of the vocalizations that match the subject of interest. The user instructs processing unit 110 to record one, two or all three or any combination of steps 315, 320 and 325. Processing unit 110 will then store 235 the audio signals in the storage unit along with the recordings of steps 315, 320 and/or 325. After the process has repeated the number of times the user specified, the process will stop. The user then instructs processing unit 110 to transmit 330 the data files to the user either remotely or by allowing the user to download the data files manually.

Figure 4:
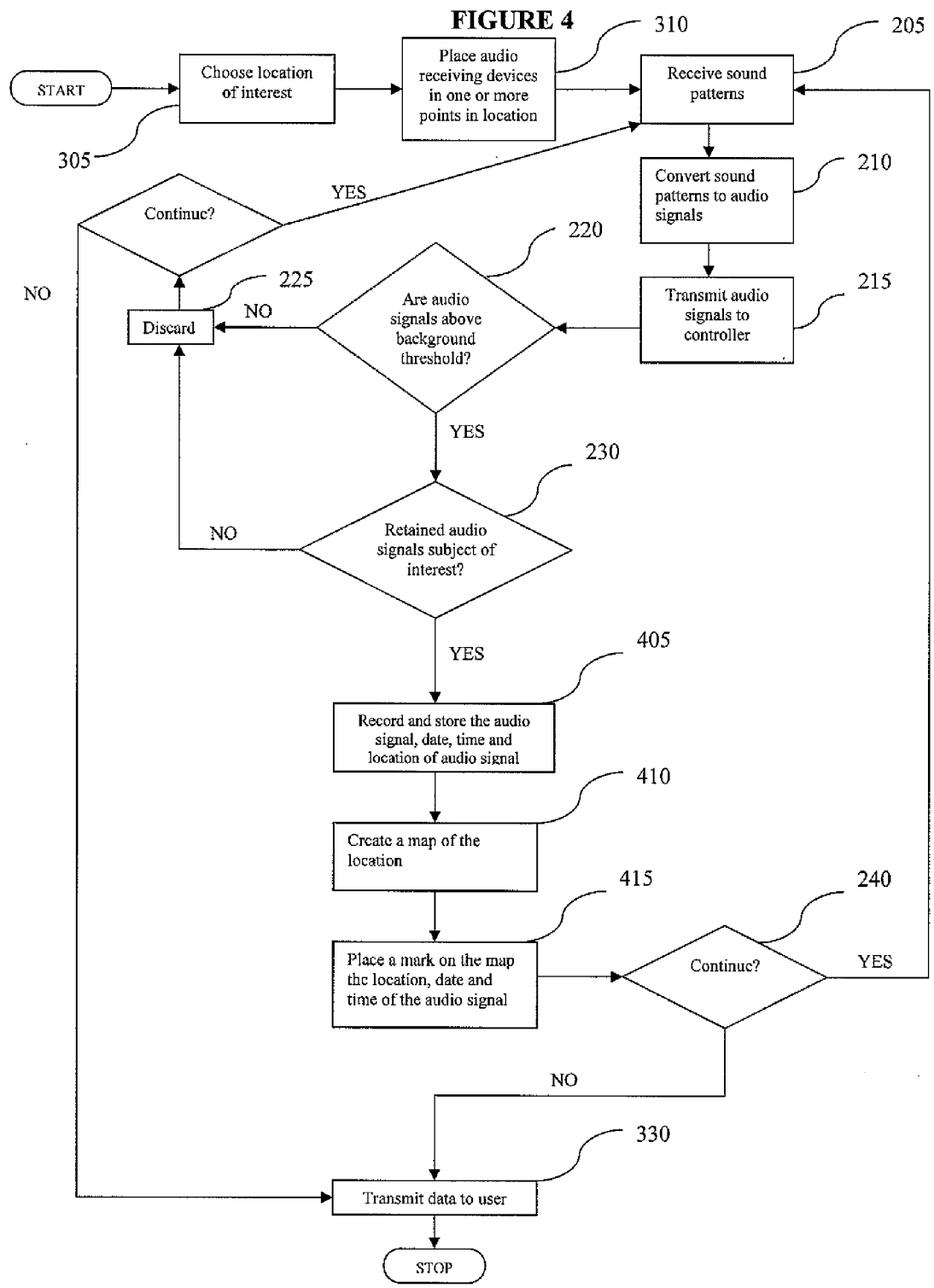
FIG. 4 is a flowchart showing a method for obtaining information of wild game in a chosen area and transposing that information onto a map of the chosen area.

FIG. 4 is a schematic illustration of a method for obtaining information and recording information of wildlife in a chosen location and providing an option to map the information gathered on the chosen location. The user chooses a location of interest 305 and then places 310 audio receiving devices 115 in one or more places in the location. Audio devices 115 capture 205 sound patterns, convert 210 the sound patterns to audio signals, transmit 215 the audio signals to the controller, filter 220 the background noise and match 230 the audio signals to a subject of interest. The user instructs processing unit 110 to record 405 the audio signal, the date, time and location of the audio signal. A map can then be created 410 of the chosen area. Mapping software, such as geographic information system, can be used to create the map 410, or a global positioning system can be installed for map creation 410. By way of illustration, audio signal locations can be marked on a map 415, using either simple symbols or more elaborate indicia indicating times, dates, or other information. The user can then transmit the data files to the user 330 either remotely or download the data files manually.

Figure 5:
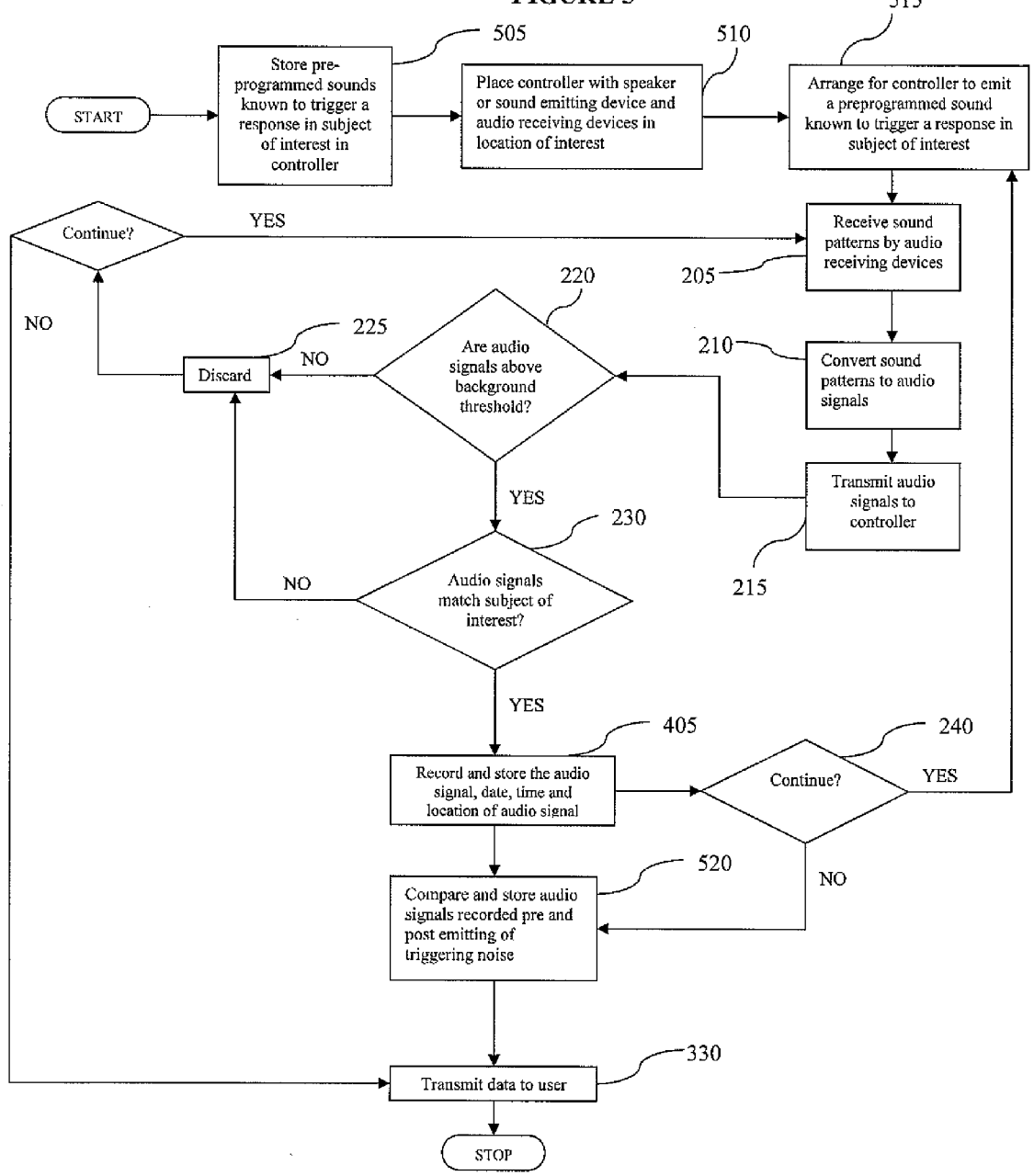
FIG. 5 is a flowchart showing a method for obtaining information of wild game in response to prerecorded audio signals.

FIG. 5 is a schematic illustration of a method for obtaining information and recording information of wildlife in a chosen location by providing a sound-emitting system that emits pre-recorded sounds known to elicit a response from the subject of interest. Pre-recorded sounds known to trigger a response in the subject of interest are uploaded into the storage unit of the controller 505. A device with speakers or other sound emitting devices is then placed in a location of interest 510. Speakers or other sound-emitting devices can either be embedded in the device or attached physically or remotely to the device. In step 515 a user programs or otherwise arranges for the device to emit the preprogrammed sounds at specified times. Alternative to programming, a user either manually or remotely triggers the pre-recorded sounds at the device. Captured audio signals are stored along with the date, time and location of the audio signals 405. The user compares audio signals emitted prior to the pre-recorded sounds being played to the audio signals that occur after the audio signals occur.

The following example is provided to further describe the present invention:

Example 1

The above-described apparatus and methods may be configured to provide a portable device that detects and records to memory the gobbles of the wild turkey. In general, the device inputs sound from a microphone, converts the sound to a digital format and compares it to a known turkey gobble. By known turkey gobble it is meant a gobble from a previously identified turkey, the gobble having been loaded on the device in a manner that allows the gobble to be compared to vocalizations of unknown subjects for determining whether the vocalizations are in fact turkey gobbles. If the vocalization is found to meet or exceed a certain threshold, it is determined that the vocalization originated from a turkey, as opposed to an owl, duck or other animal. In this way, turkeys can be identified and their movements tracked.

Figure 6:
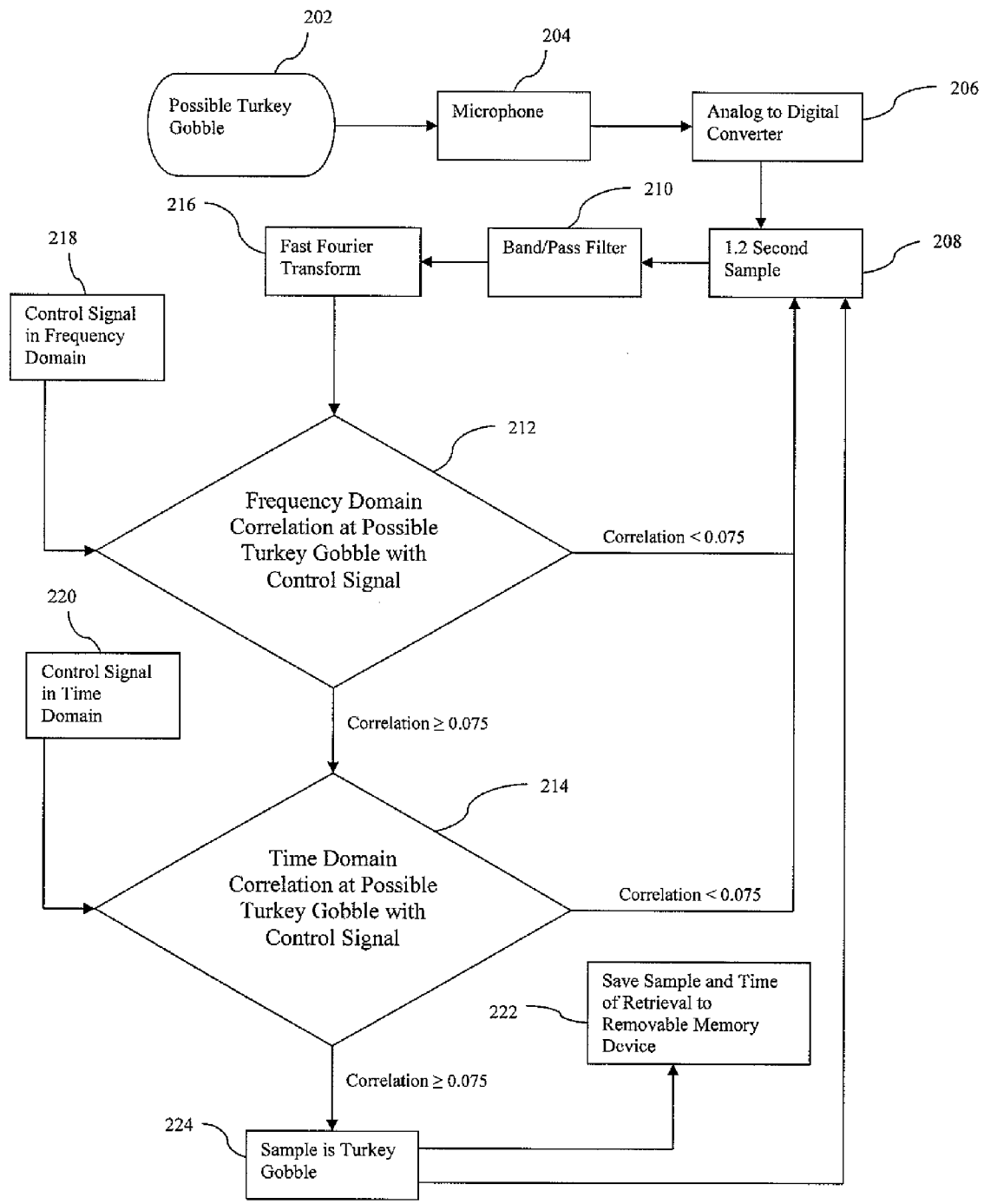
FIG. 6 is a flow chart showing a method for identifying turkey gobbles in a chosen area.

More particularly, referring to FIG. 6, a process 200 is depicted for the detection and identification of a turkey and turkey gobble. Process 200 includes detecting a possible turkey gobble 200 with a microphone 204 and converting the possible turkey gobble 200 to a digital signal using an analog to digital converter 206. Converter 206 transmits a digital, 1.2 second sample signal 208 to a band-pass filter 210 for extracting from signal 208 the information that is attributable to turkey gobble 202. In this way, background noise that may have been received by microphone 204 with possible turkey gobble 202 is removed from signal 208. The filtered 1.2 second sample signal is then compared in a frequency domain 212 and a time domain 214 by use of a fast Fourier transform (FFT) 216 to a known turkey gobble (control signal) similarly in frequency domain 218 and time domain 220 to determine if the filtered signal demonstrated the characteristics close enough to be classified as a turkey gobble. For purpose of the present invention, the time domain is a function of intensity or loudness of a gobble versus time. Every animal sound produces a unique "shape" in the time domain. Time domain 220 of the control signal is produced by analyzing a control signal taken from a known turkey gobble and calculating the time domain envelope (approximate shape). That time domain envelop or time domain 220 is then correlated with the time domain calculated from the filtered signal emitted from bandpass filter 210 to determine how close they are. However, not all turkeys have the same gobble so their respective time domains may look slightly different. Consequently, a correlation must also be made in the frequency domain name to improve the efficiency of determining whether a sound is a turkey gobble or not.

To be close enough to be classified as a turkey gobble, a correlation coefficient of greater than 0.075 must be found to exist. This is accomplished by correlating the control signal from frequency domain 218 with the filtered signal emitted from band-pass filter 210. If the value is greater than 0.075, thereby indicating that turkey gobble 202 is in fact a turkey gobble, the filtered signal is then sent to the comparison engine for determine if time domain correlation 214 is approximately 0.075. If this holds true, then the filtered sample signal is saved onto a storage device 222 and the process is repeated until the operator physically stops the device. If the required correlation is not found to exist, i.e., a correlation of less than 0.075, then the sample is dropped and the algorithm inputs the next sample.

Figure 7:
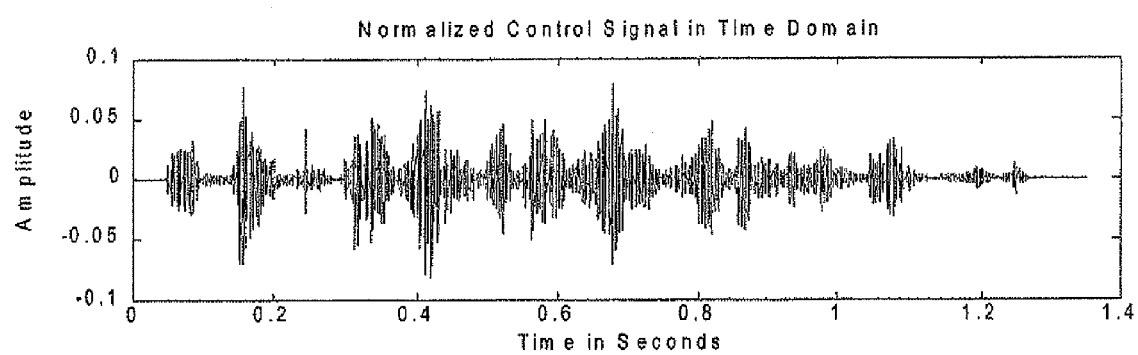
FIG. 7 is a graph of a control signal (Turkey Gobble) in Time Domain with the X-axis being Time in seconds and the Y-axis being Amplitude.
Figure 8:
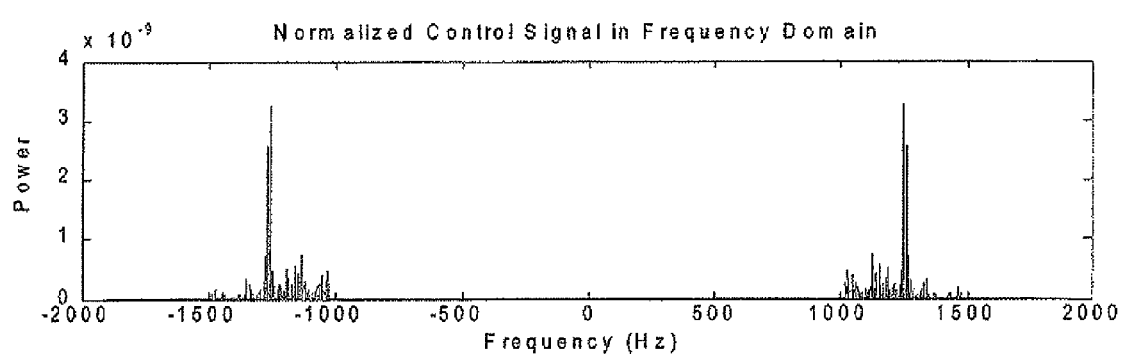
FIG. 8 is a graph of a control signal (Turkey Gobble) in Frequency Domain with the X-axis being Frequency in hertz and the Y-axis being power.
Figure 9:
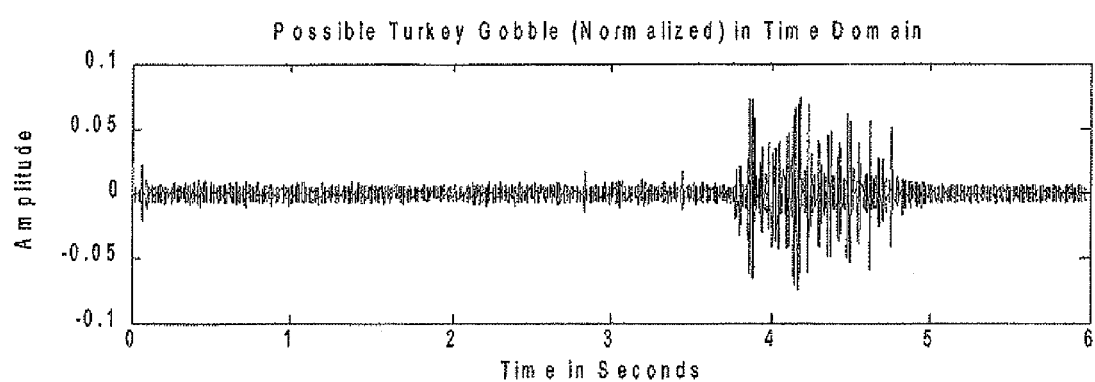
FIG. 9 is a graph of an unknown signal prior to filtering in Time Domain with the X-axis being Time in seconds and the Y-axis being Amplitude.
Figure 10:
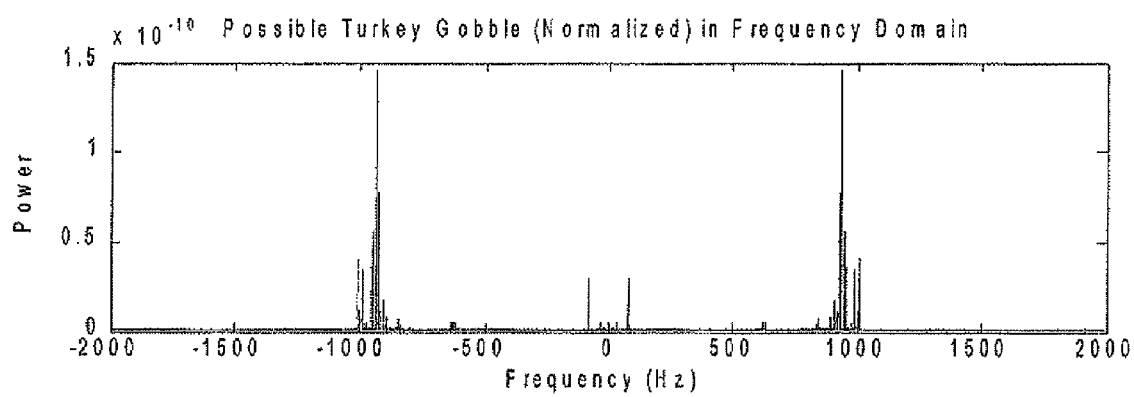
FIG. 10 is a graph of an unknown signal after to filtering in Frequency Domain with the X-axis being Frequency in hertz and the Y-axis being power.
Figure 11:
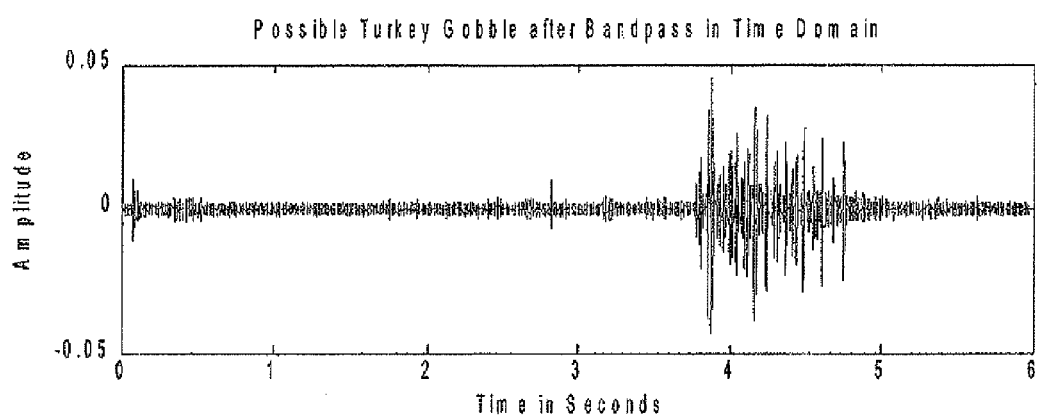
FIG. 11 is a graph of an unknown signal after filtering in Time Domain with the X-axis being Time in seconds and the Y-axis being Amplitude.
Figure 12:
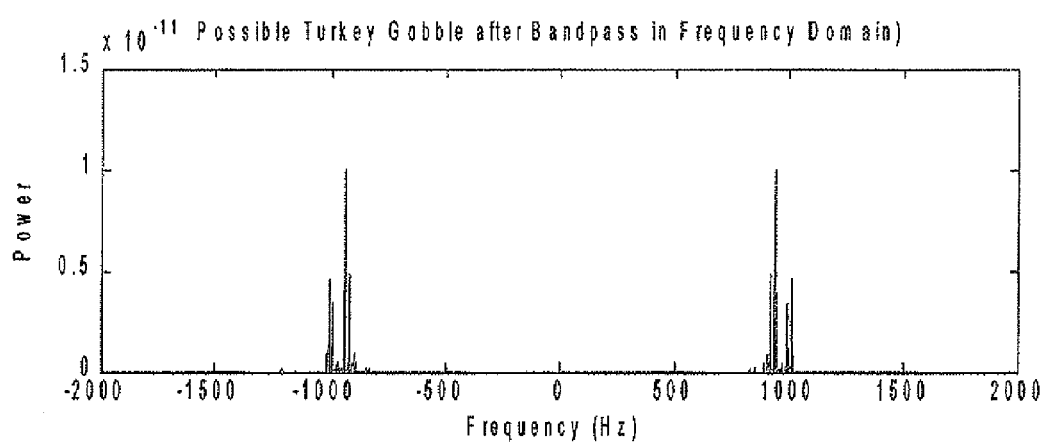
FIG. 12 is a graph of an unknown signal after filtering in Frequency Domain with the X-axis being Frequency in hertz and the Y-axis being power.

FIG. 7 depicts a normalized control signal of a turkey gobble in the time domain. FIG. 8 depicts a normalized control signal of a turkey gobble in the frequency domain name. FIG. 9 depicts a set of normalized extracted data or a possible turkey gobble in the time domain. FIG. 10 depicts a set of normalized extracted data or a possible turkey gobble in the time domain. FIG. 11 depicts the signal of FIG. 9 and FIG. 12 depicts the signal of FIG. 10 following filtering of the signals by a band-pass filter to remove any characteristics not common to turkey gobbles.

FIG. 13 is a table listing the degrees of time domain and frequency domain correlations between seventy different turkey gobbles and a control signal, for example, as depicted in FIGS. 7 and 8. For example, the correlation coefficients for the turkey gobble depicted in FIGS. 9 and 10 is shown in row 30 of FIG. 13. As shown in row 30, the time domain correlates at 0.091 and the frequency domain correlates at 0.0873.

FIG. 14 is a table listing seven sets of different samples that are known to not be turkey gobbles. This table demonstrated the lower correlation coefficients of samples that are known not to be turkey gobbles. There is an overlap of values between the tables depicted in FIGS. 13 and 14. This is because row 1 in FIG. 14 of the non turkey gobble table giving higher correlation coefficients than nine of the known turkey gobbles. The affected rows of the turkey gobble table depicted in FIG. 13 are rows 14, 21, 22, 25, 27, 50, 54, 57 and 63. This represents an accuracy of 87.14%.

It is contemplated that the apparatus can be configured to distinguish turkeys from one another so that the number of turkeys, not just the number of gobbles, can be determined in an area. One way this can occur is, subsequent to determining that a sound is a turkey gobble, comparing the sound to the time domain and frequency domain of each of the gobbles stored on memory device 222. A very high correlation coefficient between the turkey gobble and one of the turkey gobbles stored on memory device 222 would indicate that the two gobbles originated from the same turkey. Obtaining only lower correlation coefficients would indicate that the turkey gobble did not originate from any of the turkeys recorded on memory device 222, thus indicating that the gobble originated from a new turkey. In this way, a user of the apparatus could locate, identify and track multiple turkeys within an area.

A technique for hunting turkeys when utilizing the apparatuses and method described above, is described in the following Example.

Example 2

Background. In the spring, a male turkey starts the morning waking up on the roost. As the hens begin to wake up, the hens start making very soft calls known as tree calls. The male turkey responds to the tree calls by strutting characterized by puffing out his feathers and drumming which is a very deep sound originating from the male turkey's chest. Drumming is almost inaudible to humans. The male turkey makes his presence known to the hens by gobbling on the roost. After the hens begin flying down to the ground from the roost, the male turkey's gobbling intensifies. Shortly thereafter, the male turkey joins the female turkeys on the ground. Once on the ground, gobbling frequency decreases especially if the male turkey is accompanied by many hens. Once on the ground, the male turkey starts strutting, drumming and following hens until they are ready to breed. The male turkey will gobble from time to time at things like crows or other loud noises or at excited hen calls or even other gobblers.

Early in the spring, the male turkey will follow the female turkeys all day. Later in the spring, turkeys breed early and the hens quickly leave to nest. This leaves the male turkey alone. At that point, the male turkey will start gobbling in an attempt to locate other female turkeys.

In view of the mating habits of turkeys, hunters begin establishing the location of turkeys prior to the season by entering the woods and listening for turkeys gobbling. Through observation, a hunter can pinpoint roosting sites and the daily routine for the turkeys. The information is important as turkeys roost in the same general area every night, fly down in the morning, travel a large loop throughout the day and end the day in the general area of the roost site. Thus, hunters that conduct this type of pre-hunting surveillance obtain a useful pattern of locations for the turkeys.

Application of the present invention to hunting turkeys. The apparatus and methods of the present invention allow a hunter to scout an area for turkeys and determine the turkeys' routine without venturing into the woods which can disrupt the turkeys' routine. The apparatus and methods also allow a hunter to scout multiple locations simultaneously. Further, by utilizing the apparatus and methods, a hunter can make better hunting decisions through possession of greater amounts of information on gobbling turkeys than available by personally observing the turkeys.

More particularly, a hunter hunting turkeys can set up the apparatus of the present invention in one or more areas where turkeys are thought to be. Utilizing the apparatus, the hunter receives information on the number of gobbles within the area, the date and time of the gobbles, and the direction and distance from the apparatus where the gobbles originated. In possession of this knowledge, on the day of the hunt, the hunter can predict where the turkeys will roost, the time of day they will begin gobbling, and the direction they will travel after leaving the roost. With this knowledge, the hunter can place himself along the historic path of travel the turkeys.

Another technique involves placing multiple devices in different areas of interest and setting the devices to notify the hunter by text or electronic mail of the presence of a turkey in a particular area in real-time. Once notified of the presence of the turkey, the hunter could move to that area to hunt that particular turkey. If multiple devices were alerting the hunter of turkeys, the hunter could move from area to area in search of turkeys, while avoiding those areas that include devices not reporting the presence of turkeys.

What is claimed is:

1. An apparatus for identifying a vocalization of a game animal, comprising:
   an audio receiving device having a recording mode, the audio receiving device placed in an outdoor hunting location for receiving sound patterns during the recording mode in proximity to the audio receiving device and for converting the received sound patterns into a plurality of audio signals, the audio receiving device comprising two or more microphones configured to receive the sound patterns and a clock unit configured to enable the recording mode during a predetermined game activity period, the predetermined game activity period comprising a period of time during which the hunter is/will be absent from the outdoor hunting location and the game animal is likely to make a vocalization;
   a controller in communication with the audio receiving device; wherein the controller receives the plurality of audio signals from the audio receiving device;
   a band-pass filter connected to the controller; the band-pass filter initially filters the plurality of audio signals;
   a processing unit connected to the controller; the processing unit evaluates the plurality of audio signals and identifies which of the plurality of audio signals are the vocalization of the game animal;
   the clock unit connected to the controller for determining a present time for the vocalization of the game animal;
   a user interface connected to the controller for receiving instructions from a user;
   a location detector connected to the controller configured to determine a direction from which the vocalization of the game animal originates based upon a relative energy estimation of the sound patterns received by the microphones and a combination of a distance and a direction of the vocalization of the game animal;
   a storage unit connected to the controller to store the vocalization of the game animal, the time of the vocalization of the game animal, the distance of the vocalization of the game animal and the direction of the vocalization of the game animal; and
   a sound producing device connected to the controller and a pre-recorded sound recording of a sound from wildlife known to elicit the vocalization of the game animal stored in the storage unit connected to the controller, the sound producing device located proximate the outdoor hunting location and configured to play the pre-recorded sound recording of the sound from wildlife known to elicit the vocalization of the game animal at a plurality of timed or trigger-dependent intervals to the outdoor hunting location during the predetermined game activity period while the apparatus is in the recording mode for receiving the sound patterns.

2. The apparatus of claim 1, and the sound from wildlife is from a different species than the game animal vocalization.

3. The apparatus of claim 1, and the sound from wildlife is from the same species as the game animal vocalization.

4. The apparatus of claim 1, and the processing unit recording the time of the playing of the sound from wildlife and the vocalization of the game animal.

5. The apparatus of claim 1, the processing unit is configured to distinguish a first game animal from a second game animal of the same species.

6. A method for eliciting and identifying a vocalization of a game animal comprising:
   placing an audio receiving device in one or more locations in an outdoor hunting area, the audio receiving device comprising a controller that contains a processing unit, two or more microphones and a sound producing device connected to the controller, and placing the audio receiving device in a recording mode for receiving one or more sound patterns from the outdoor hunting area for a predetermined game activity period, the predetermined game activity period comprising a period of time during which the hunter is/will be absent from the outdoor hunting location and the game animal is likely to make the vocalization;
   playing a sound recording of a sound from wildlife known to elicit the vocalization of the game animal to the outdoor hunting area during the predetermined game activity period at a plurality of timed or trigger-dependent intervals by the sound producing device while the audio receiving device is in the recording mode;
   receiving sound patterns from the outdoor hunting location during the predetermined game activity period by the audio receiving device;
   converting the sound patterns received by the audio receiving device into audio signals; and
   analyzing the audio signals to determine if any of the audio signals is the vocalization of the game animal by a first step of filtering the audio signals and a second step of comparing the filtered audio signals to a control signal.

7. The method of claim 6 further comprising determining a direction of the vocalization of the game animal by the controller.

8. The method of claim 6 further comprising determining a distance of the vocalization of the game animal by the controller.

9. The method of claim 6, further comprising determining a location of the vocalization of the game animal based upon a relative energy estimation and a combination of a distance and a direction of the sound pattern received by the two or more microphones of the audio receiving device.

10. The method of claim 6, further comprising playing the sound recording of the sound from wildlife in response to a command received from a remote user computing device in wireless communication with the sound producing device.

11. The method of claim 6 further comprising reducing power consumption of the audio recording device by sound-activating the audio receiving device.

12. The method of claim 11, the sound-activating triggered by:
   receiving by the microphones a sound of a minimum amplitude pre-set to be of an amplitude of the game animal vocalization;
   powering on the controller in response to receipt of the sound of the minimum amplitude; and
   powering off the controller in response to the received sounds falling below the minimum amplitude.

13. The method of claim 6 further comprising determining a time and/or date of occurrence for the vocalization of the game animal.

14. The method of claim 6 further comprising reducing power consumption of the audio recording device by time-triggering the audio receiving device.

15. The method of claim 6 further comprising determining the location of the vocalization of the game animal, the date of the vocalization of the game animal and the time of the vocalization of the game animal.

16. The method of claim 15 further comprising creating a map of the outdoor hunting location that includes the plurality of locations wherein the location of the vocalization of the game animal, the date of the vocalization of the game animal and the time of the vocalization of the game animal are recorded on the map.

17. The method of claim 16 further comprising mapping the vocalizations of a first game animal and the vocalizations of a second game animal simultaneously.

18. The method of claim 17, further comprising mapping the the outdoor hunting location based upon the location of the vocalization, a time of the vocalization and a date of the vocalization.

19. The method according to claim 16, the outdoor hunting location comprising a wooded terrain.

20. The method of claim 6 further comprising distinguishing an elicited vocalization of a first game animal from an elicited vocalization of a second game animal of the same species.

21. A method for hunting one or more wild turkeys comprising:
placing two or more audio receiving devices in two or more locations in an outdoor hunting area, each audio receiving device comprising two or more microphones configured to receive one or more sound patterns and a sound producing device configured to play a sound recording of a sound of wildlife in an area proximate the audio receiving device, the two or more audio receiving devices remotely connected to a controller that contains a processing unit, the two or more audio receiving devices each comprising a transceiver configured to transmit the sound patterns to the controller and receive the sound recording from the controller;
playing the sound recording of the sound of wildlife in the outdoor hunting location at a plurality of timed or trigger-dependent intervals by the sound producing device while the audio receiving device is in a recording mode for receiving the one or more sound patterns during a predetermined game activity period, the predetermined game activity period comprising a period of time during which the hunter is/will be absent from the outdoor hunting location and a wild turkey is likely to make a vocalization, the sound of wildlife recording comprising an animal sound known to elicit a wild turkey vocalization;
receiving the one or more sound patterns by at least one of the two or more audio receiving devices and sending the sound pattern to the controller by the transceiver;
converting the one or more sound patterns into one or more audio signals by the controller;
analyzing the one or more audio signals to determine if the audio signal is a wild turkey vocalization by filtering the audio signal by a filter connected to the controller;
identifying the wild turkey vocalization based upon a comparison by the controller of the audio signal to a time domain and a frequency domain of a pre-recorded turkey vocalization stored in a memory device connected to the controller;
determining a location of the vocalization by a location device connected to the controller based upon a relative energy estimation and a combination of a distance and a direction of the sound pattern received by the two microphones of at least one of the two or more audio receiving devices, and if the sound pattern is received by two or more audio receiving devices, based upon a comparison of the sound pattern received by the two or more audio receiving devices; and
mapping the vocalization of the wild turkey in the outdoor hunting location based upon the location, a distance from at least one of the two or more audio receiving devices, and a time and a date of the vocalization recorded by a clock unit connected to the controller.

22. The method of claim 21 further comprising:
receiving two or more audio signals by the two or more audio receiving devices;
identifying the two or more audio signals as two turkey vocalizations; and
comparing a time domain and a frequency domain of the vocalizations to determine whether the vocalizations originate from the same turkey or originate from two different turkeys.

23. The method of claim 21 further comprising remotely determining a location of a turkey roosting based upon the mapping of multiple turkey vocalizations.

24. The method of claim 21, further comprising identifying that the audio signal is the wild turkey vocalization if, based upon the comparison of the time and frequency domains of the turkey vocalization and the pre-recorded turkey vocalization, there is a correlation coefficient of eater than 0.075.

25. The method of claim 21 further comprising;
placing the two or more audio receiving devices in two areas of interest; and
transmitting a notification by a communication interface connected to the controller to a mobile device of a remote user notifying the user in real-time of receipt of a turkey vocalization by at least one of the two or more audio receiving devices, the notification comprising the location of the turkey vocalization within the outdoor hunting location.

* * * * *